United States Patent [19]

Kuhlmann

[11] Patent Number: 4,898,447

[45] Date of Patent: Feb. 6, 1990

[54] OPTOELECTRONIC COUPLING SYSTEM

[75] Inventor: Werner Kuhlmann, Munich, Fed. Rep. of Germany

[73] Assignee: Siemens Aktiengesellschaft, Berlin and Munich, Fed. Rep. of Germany

[21] Appl. No.: 319,398

[22] Filed: Mar. 3, 1989

[30] Foreign Application Priority Data

Mar. 31, 1988 [DE] Fed. Rep. of Germany ....... 3810936

[51] Int. Cl.$^4$ .............................................. G02B 6/42
[52] U.S. Cl. .............................. 350/96.20; 350/96.15
[58] Field of Search ........................... 350/96.15, 96.20

[56] References Cited

U.S. PATENT DOCUMENTS

| 4,107,517 | 8/1978 | Cooper | 350/96.15 X |
| 4,109,997 | 8/1978 | Iverson | 350/96.15 X |
| 4,277,134 | 7/1981 | Upton, Jr. | 350/96.20 |
| 4,436,367 | 3/1984 | Lewis et al. | 350/96.20 |
| 4,525,025 | 6/1985 | Hohman et al. | 350/96.20 X |
| 4,643,521 | 2/1987 | Harstead et al. | 350/96.20 |

Primary Examiner—John D. Lee
Assistant Examiner—Phan T. Heartney
Attorney, Agent, or Firm—John Francis Moran

[57] ABSTRACT

An optoelectronic coupling arrangement for a light waveguide cable (3), at each of whose ends an optoelectronic transmitter and/or receiver structural unit (1, 2) are optically coupled to, permit a signal or data transmission to or from an arbitrarily rotatable electronic system. The light waveguide cable (3) is flexible, but torsionally-stable or not rotated, and connected at its one end with the one optoelectronic transmitter and/or receiver structural element (1). The light waveguide cable (3) is separated at its other end into two axially opposing members which are each fastened in their lateral portions of a pivot bearing (4) and, consequently, are coupled axially rotatable optically and mechanically with each other. The lateral portion of the pivot bearing (4) associated with the end member of the light waveguide cable (3) is rigidly connected with a carrier (6) rotatable about an axis of rotation (5) on which the other optoelectronic transmitter and/or receiver structural unit (2) is fastened. An application for an optoelectronic coupling system according to the invention is in particular computer tomography systems.

11 Claims, 1 Drawing Sheet

OPTOELECTRONIC COUPLING SYSTEM

BACKGROUND OF THE INVENTION

The invention relates to an optoelectronic coupling arrangement including a light waveguide cable whose ends are each optically coupled to an optoelectronic transmitter and/or receiver structural element.

Such systems for the electronic signal transmission in light waveguides are known. A typical transmission system includes an optical transmitter (either a light-emitting diode or a laser diode), the light waveguide transmission medium (either a multimode or a monomode fiber) and an optical receiver (either a photodiode or a phototransistor). Compared to coaxial transmission systems, the light waveguide system permits broad transmission channels over large distances at simultaneously low attenuation. Due to the non-linear distortion of the electro-optical system, the electro-optical signal transmission is especially suitable for a digital signal transmission.

Due to this and additional advantages, it is desirable to be able to apply such a system also for signal or data transmission onto or from arbitrarily rotatable electro-mechanical systems. However, the problem herein is that in these systems transmission via the customary light waveguide cables is not possible since these cannot be subject to a continuous rotation.

Conventional devices for signal or data transmission onto or from rotatable systems utilize, for example, with sliding contacts. Such systems are, however, unreliable and subject to disturbances. Systems based on radio transmission are also sensitive to disturbances in particular in an environment capable of carrying strong electromagnetic load. Moreover, several systems can mutually influence each other.

SUMMARY OF THE INVENTION

An object of the present invention is based on obviating these disadvantages and permitting with an optoelectronic coupling system of the foregoing described type, a signal or data transmission to or from arbitrarily rotatable systems.

In an illustrative embodiment of the invention a light waveguide cable has its ends optically coupled to an optoelectronic conversion unit. The light waveguide is flexible yet torsionally-stable so that it is not subject to rotation at this one end coupled to one optoelectronic conversion unit. The other end of the light waveguide cable is separated into two axially opposing end members which are each fastened to one of two lateral portions of a pivot bearing. The pivot bearing includes the two lateral portions axially rotatable with respect to each other while optically coupled to each other. The lateral portion of the pivot bearing associated with one end of the light waveguide cable is rigidly connected with a carrier rotatable about a rotational axis and has the other optoelectronic conversion unit mounted thereon to the one end member of the light waveguide cable.

In some of the further aspects of the invention, the rotatable carrier takes the form of a rotary plate. The pivot bearing has a ball bearing construction. The pivot bearing and the optoelectronic conversion unit are disposed eccentrically on the rotatable carrier. The light waveguide cable is split at its ends for bidirectional transmission.

The advantages achieved in accordance with the invention particularly include permitting data transmission employing light waveguides from or to rotatable systems wherein the coupling arrangement according to the principles of the invention in that the rotational motion is intercepted at a coupling site.

Due to the high bit rate which is achieved with the coupling system according to the invention such a system can also, for example, transmit high quality television pictures serially. An electromagnetic disturbance of the signal transmission is impossible; transmitter and receiver are, in addition, galvanically completely separated to provide isolation.

An advantageous application of the disclosed system is in computer tomography. In such applications, data is required to be transmitted from a rotatable measuring sensor to a computer where the axis of rotation represents the receiving space for the patient and is not usable.

BRIEF DESCRIPTION OF THE DRAWING

Features of the invention and additional objects of the invention will be more readily appreciated and better understood by reference to the following detailed description which should be considered in conjunction with the drawing.

DETAILED DESCRIPTION

Figure 1:
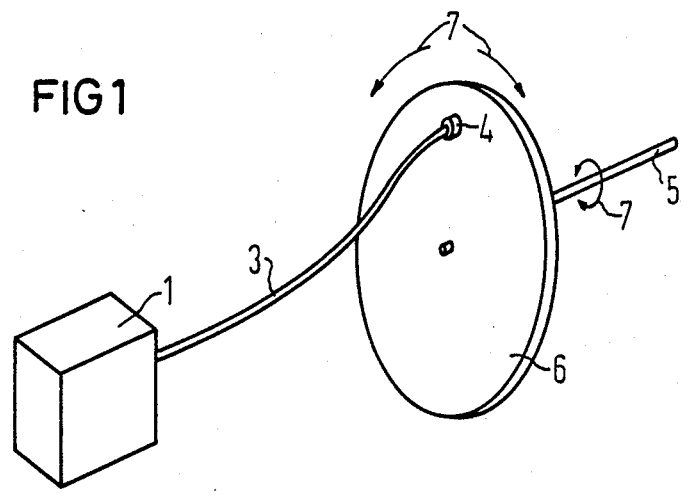
FIG. 1 provides a schematic representation of an optoelectronic coupling system according to the invention.
Figure 2:
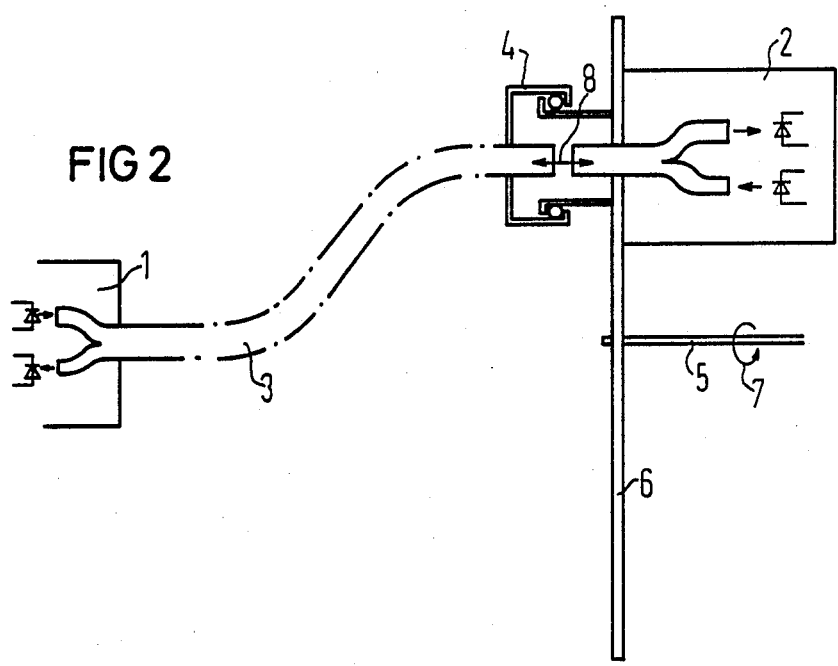
FIG. 2 illustrates a cross section view of a coupling arrangement according to the invention.

The optoelectronic coupling system depicted in FIGS. 1 and 2 basically includes a flexible but torsionally-stable or not rotatable light waveguide cable 3 each of whose ends are optically coupled to an optoelectronic transmitter and receiver structural element 1, 2 so that the data or signal transmission in this illustrative embodiment can take place bidirectionally. The light waveguide cable 3 in accordance with the invention is split at both ends. One optoelectronic transmitter and receiver structural unit 1 is located in a fixed station. At the other end of the light waveguide cable 3, a pivot bearing 4 is located. The pivot bearing 4 is in the form of preferably a ball bearing whose second half or whose one side portion is rigidly connected with a rotating system. The rotating system includes a carrier 6, preferably a rotary table which is rotatable about an axis of rotation 5 in the direction indicated by the arrows 7 present in FIGS. 1 and 2. The connection site of pivot bearing 4 and rotary plate or carrier 6 may be located in any position, in particular also eccentrically, on the rotary plate or carrier 6. The light waveguide cable 3 is physically interrupted in two pieces in the pivot bearing 4. However, optically coupling takes between the two pieces at this interrupted site. It may be advisable to further support this coupling with a system of lenses. The bidirectional coupling of the light is indicated in FIG. 2 by double or dual directional arrow 8. The interruption occurs so that the light waveguide cable 3 is separated into two axially opposing members which each are fastened in their side parts of the pivot bearing 4 and, consequently, are axially optically and mechanically coupled with each other. The side part of the pivot bearing 4 provided with the end member of the light waveguide cable 3 is rigidly connected with the carrier (rotary plate) 6 rotatable about the axis of rotation 5 at that site at which the other optoelectronic transmitter and receiver structural element 2 is fastened and optically coupled to the end member of the light waveguide cable 3.

There has thus been shown and described a novel optoelectronic coupling system which fulfills all the objects and advantages sought therefor. Many changes, modifications, variations and other uses and applications of the subject invention will, however, become apparent to those skilled in the art after considering this specification and the accompanying drawing which disclose the preferred embodiments thereof. All such changes, modifications, variations and other uses and applications which do not depart from the spirit and scope of the invention are deemed to be covered by the invention which is limited only by the claims which follow.

I claim:

1. An optoelectronic coupling system including a light waveguide cable at each of whose ends are optically coupled to an optoelectronic conversion unit, the system characterized by the light waveguide cable being flexible yet torsionally-stable and being connected at its one end to one optoelectronic conversion unit, the light waveguide cable being separated at the other end into two axially opposing end members which are each fastened to one of two lateral portions of a pivot bearing, the pivot bearing having two lateral portions axially rotatable with respect to each other while the end members of the light waveguide cable are axially aligned and optically coupled end to end to each other, and the lateral portion of the pivot bearing associated with one end member of the light waveguide cable is rigidly connected with a carrier rotatable about an axis of rotation on which carrier the other optoelectronic conversion unit is fastened for optic coupling to one end member of the light waveguide cable.

2. An optoelectronic coupling system according to claim 1, characterized in that the rotatable carrier is a rotary plate.

3. An optoelectronic coupling system according to claim I, characterized in that the pivot bearing is a ball bearing.

4. An optoelectronic coupling system according to claim 1, characterized in that the pivot bearing and one optoelectronic conversion unit are disposed eccentrically on the rotatable carrier.

5. An optoelectronic coupling system according to claim 1, characterized in that the light waveguide cable is split at its ends for bidirectional transmission.

6. An optoelectronic coupling system according to claim 2, characterized in that the pivot bearing is a ball bearing.

7. An optoelectronic coupling system according to claim 2, characterized in that the pivot bearing and one optoelectronic conversion unit are disposed eccentrically on the rotatable carrier.

8. An optoelectronic coupling system according to claim 2, characterized in that the light waveguide cable is split at its ends for bidirectional transmission.

9. An optoelectronic coupling system according to claim 3, characterized in that the pivot bearing and one optoelectronic conversion unit are disposed eccentrically on the rotatable carrier.

10. An optoelectronic coupling system according to claim 3, characterized in that the light waveguide cable is split at its ends for bidirectional transmission.

11. An optoelectronic coupling system according to claim 4, characterized in that the light waveguide cable is split at its ends for bidirectional transmission.

* * * * *